US009328746B2

(12) United States Patent
Hyodo et al.

(10) Patent No.: US 9,328,746 B2
(45) Date of Patent: May 3, 2016

(54) ACCUMULATOR

(71) Applicant: EAGLE INDUSTRY CO., LTD., Tokyo (JP)

(72) Inventors: Daisuke Hyodo, Fujisawa (JP); Kuniaki Miyake, Tokyo (JP); Matsuyoshi Yamashita, Tokyo (JP)

(73) Assignee: Eagle Industry Co., Ltd. (JP)

( * ) Notice: Subject to any disclaimer, the term of this patent is extended or adjusted under 35 U.S.C. 154(b) by 0 days.

(21) Appl. No.: 14/421,167

(22) PCT Filed: Dec. 5, 2013

(86) PCT No.: PCT/JP2013/082656

§ 371 (c)(1),
(2) Date: Feb. 12, 2015

(87) PCT Pub. No.: WO2014/125703

PCT Pub. Date: Aug. 21, 2014

(65) Prior Publication Data

US 2015/0204357 A1 Jul. 23, 2015

(30) Foreign Application Priority Data

Feb. 15, 2013 (JP) ................................ 2013-027631

(51) Int. Cl.
*F16L 55/04* (2006.01)
*F15B 1/10* (2006.01)
*F15B 20/00* (2006.01)

(52) U.S. Cl.
CPC ............... *F15B 1/103* (2013.01); *F15B 20/007* (2013.01); *F15B 2201/3153* (2013.01); *F15B 2201/3157* (2013.01); *F15B 2211/865* (2013.01)

(58) Field of Classification Search
CPC ............... F15B 1/103; F15B 2201/205; F15B 2201/3153; F16L 55/053
USPC .................... 138/30, 31, 26; 220/721; 303/87
See application file for complete search history.

(56) References Cited

U.S. PATENT DOCUMENTS 7,377,292 B2 * 5/2008 Mori ...................... F15B 1/103 138/26
7,770,599 B2 * 8/2010 Ota ........................ F15B 1/103 138/26

(Continued)

FOREIGN PATENT DOCUMENTS

| | | | |
|---|---|---|---|
| CN | 102227563 | A | 10/2011 |
| EP | 2860406 | A1 | 4/2015 |
| JP | 2009-092145 | A | 4/2009 |
| JP | 2009-127664 | A | 6/2009 |
| JP | 2010-112431 | A | 5/2010 |

(Continued)

OTHER PUBLICATIONS

Extended European Search Report for Application No. EP 13875034.4 dated Jan. 26, 2016 (5 pages).

*Primary Examiner* — Patrick F Brinson
(74) *Attorney, Agent, or Firm* — Harness, Dickey & Pierce, P.L.C.

(57) ABSTRACT

An accumulator has a seal member retained to a port hole side of a bellows cap via a seal holder. The seal member comes into contact with a seal portion so as to occlude a liquid chamber in the case that an operation of a device stops and the pressure within a pressure piping is lowered. The seal member moves in a direction that the bellows cap moves away from the seal portion while being in contact with the seal portion when the liquid confined in the liquid chamber thermally expands in a state in which the liquid chamber is occluded. The seal member is obtained by attaching a flexible portion constructed by a rubber-like elastic body to an outer peripheral surface of a rigid plate, and the flexible portion allows relative movement of the bellows cap by shear deformation on the basis of engagement with the seal holder.

16 Claims, 15 Drawing Sheets

(56) References Cited

U.S. PATENT DOCUMENTS

| | | | |
|---|---|---|---|
| 2010/0108168 | A1 | 5/2010 | Ota et al. |
| 2010/0193059 | A1 | 8/2010 | Nakaoka et al. |
| 2014/0224368 | A1 | 8/2014 | Yamashita |

FOREIGN PATENT DOCUMENTS

| | | | |
|---|---|---|---|
| JP | 2010-151286 | A | 7/2010 |
| JP | 2011-226557 | A | 11/2011 |
| JP | 2013-194871 | A | 9/2013 |

* cited by examiner

ACCUMULATOR

CROSS-REFERENCE TO RELATED APPLICATIONS

This application is a 371 U.S. National Stage Application of International Application No. PCT/JP2013/082656 filed on Dec. 5, 2013, and published in Japanese as WO 2014/125703 A1 on Aug. 21, 2014. This application claims priority to Japanese Application No. 2013-027631 filed on Feb. 15, 2013. The entire disclosures of the above applications are incorporated herein by reference.

BACKGROUND OF THE INVENTION

1. Field of the Invention

The present invention relates to an accumulator which is used as a pressure accumulator or a pulsation pressure damping device. The accumulator according to the present invention is used, for example, for a hydraulic piping in a vehicle such as a motor vehicle.

2. Description of the Conventional Art

There has been conventionally know an accumulator which is structured such that an internal space of an accumulator housing 2 is partitioned into a gas chamber 11 to which a high pressure gas is sealed and a liquid chamber 12 which is communicated with a port hole 5, by arranging a bellows 9 and a bellows cap 10 in an inner portion of the accumulator housing 2 having the port hole 5 connected to a pressure piping of a device, as shown in FIG. 12. In the accumulator, in the case that the operation of the device stops and the pressure within the pressure piping is lowered, the liquid (the oil) within the liquid chamber 12 is discharged little by little from the port hole 5, the bellows 9 is accordingly elongated little by little due to the charged gas pressure, and the bellows cap 10 comes into contact with a seal portion 15 so as to form a so-called zero-down state. The seal portion 15 is constructed by a lip seal which is provided in an inner opening peripheral edge portion of the port hole 5. Further, in this zero-down state, the liquid chamber 12 is occluded on the basis of the contact of the bellows cap 10 with the seal portion 15, the liquid is partially confined in the liquid chamber 12, and the pressure of the confined liquid is balanced with the gas pressure of the gas chamber 11. As a result, any excessive stress is not applied to the bellows 9, and it is accordingly possible to inhibit plastic deformation from being generated in the bellows 9 (refer to FIG. 6 of Japanese Unexamined Patent Publication No. 2009-092145).

However, in the case that the zero-down state due to the operation stop of the device is generated under a low temperature condition, and the temperature rises thereafter, each of the liquid and the charged gas confined in the liquid chamber 12 is thermally inflated, and the pressure rises. In this case, a rising degree of the pressure is greater in the liquid in comparison with the charged gas, however, since a pressure receiving area in the bellows cap 10 is set to be smaller than that in the charged gas side, the bellows cap 10 does not move until the liquid pressure becomes significantly greater than the gas pressure, and the bellows cap 10 does move away from the seal portion 15.

Therefore, a pressure difference stretching for about several MPa may be generated between the liquid pressure and the gas pressure in inner and outer sides of the bellows 9, and there is a risk that the plastic deformation is generated in the bellows 9 if the great pressure difference is generated as mentioned above.

In order to dissolve the disadvantage mentioned above, the inventors of the present invention have proposed previously an accumulator which is provided with the following countermeasures.

More specifically, as shown in FIG. 13, in the accumulator, a seal member 31 is retained to the port hole 5 side of the bellows cap 10 via a seal holder 21, and the seal member 31 comes into contact with the seal portion 15 at the zero-down time. The seal member 31 is constructed by a discoid rigid plate, and an outer diameter thereof is set to be larger than an inner diameter of a flange portion 21*b* of the seal holder 21. Therefore, the seal member 31 is retained by the seal holder 21. Further, since a thickness of the seal member 31 is set to be smaller than a distance between the flange portion 21*b* and the bellows cap 10, the seal member 31 can relatively move in relation to the seal holder 21 and the bellows cap 10 within a range of a dimensional difference. Further, since a spring member 41 pressing the seal member 31 is embedded between the flange portion 21*b* and the seal member 31, the seal member 31 is pressed to the bellows cap 10 in an initial state.

The accumulator is connected to a pressure piping of the device and is activated as follows.

Steady Activating Time

Since the seal member 31 is away from the seal portion 15 by moving together with the bellows cap 10 in a state in which the seal member 31 is retained by the seal holder 21 at the steady activating time of the accumulator as shown in FIG. 13, the port hole 5 which is open to an inner peripheral side of the seal portion 15 is open. Therefore, the port hole 5 is communicated with the liquid chamber 12. Accordingly, since the liquid having a pressure at any given time is introduced to the liquid chamber 12 from the port hole 5, the bellows cap 10 moves at pleasure together with the seal member 31 in such a manner that the liquid pressure and the charged gas pressure are balanced with each other.

Zero-Down Time

In the case that the operation of the device stops and the pressure within the pressure piping is lowered, the liquid within the liquid chamber 12 is discharged little by little from the port hole 5, and the bellows cap 10 is accordingly moved on the basis of the charged gas pressure in such a direction that the bellows cap 10 comes close to the seal portion 15. As a result, the seal member 31 comes into contact with the seal portion 15 as shown in FIG. 14 so as to form the zero-down state. Therefore, since the liquid chamber 12 is occluded and the partial liquid is confined in the liquid chamber 12, any further pressure reduction is not generated in the liquid chamber. Therefore, there is achieved a state in which the liquid pressure and the charged gas pressure are balanced in the inner and outer sides of the bellows 9.

Thermal Expanding Time in Zero-Down State

In the case that the liquid and the charged gas confined in the liquid chamber 12 are thermally expanded due to the rise of the atmosphere temperature in the zero-down state, that is, the state in which the seal member 31 comes into contact with the seal portion 15 and the liquid chamber 12 is occluded, the pressure difference is generated since the rising degree of the pressure is greater in the liquid than in the gas. However, in the accumulator, the bellows cap 10 moves toward a direction that the bellows cap 10 moves away from the seal portion 15 while compressing the spring member 41, on the basis of the pressure difference, as shown in FIG. 15. Accordingly, since the state in which the liquid pressure and the charged gas pressure are balanced is maintained, the pressure difference is not generated in the inner and outer sides of the bellows 9. As a result, it is possible to inhibit the plastic deformation from being generated in the bellows 9. At this time, since the pressure receiving area of the seal member 31 in the state in which the seal member 31 is in contact with the seal portion 15 is greater in the surface close to the bellows cap 10 side than the surface close to the seal portion 15 side, the seal member 31 does not move while being in contact with the seal portion 15 on the basis of the difference of the pressure receiving area in both the surfaces. Therefore, the port hole 5 open to the inner peripheral side of the seal portion 15 is kept closed.

As described above, according to the accumulator in FIG. 13, it is possible to reduce the pressure difference generated by the difference of coefficient of thermal expansion in the case that the liquid and the charged gas confined in the liquid chamber 12 thermally expands at the zero-down time. As a result, it is possible to inhibit the plastic deformation from being generated in the bellows 9 (refer to FIGS. 1 to 3 of Japanese Unexamined Patent Publication No. 2009-092145).

However, there has been room for improvement in the following points, in the accumulator shown in FIG. 13.

More specifically, since the accumulator shown in FIG. 13 mentioned above reduces the pressure difference which is generated by the difference of coefficient of thermal expansion in the case that the liquid and the charged gas confined in the liquid chamber 12 thermally expands at the zero-down time, there occurs such an activation that the seal member 31 does not move while being in contact with the seal portion 15 and only the bellows cap 10 moves in the direction that the bellows cap 10 moves away from the seal portion 15. Therefore, the seal member 31 is structured such as to relatively move in relation to the seal holder 21 and the bellows cap 10, and an allowance dimension for relatively moving the seal member 31 is set in the seal holder 21 for enabling the relative movement. In other words, a distance between the flange portion 21*b* of the seal holder 21 and the bellows cap 10 is set to be greater than a thickness of the seal member 31, and the spring member 41 is embedded between the flange portion 21*b* and the seal member 31 under the condition.

Therefore, according to the accumulator in FIG. 13 mentioned above, since it is necessary to embed the spring member 41 together with the seal member 31 within the seal holder 21 while setting a length of the seal holder 21 to be larger than the thickness of the seal member 31, the parts are large scaled and the number of the parts is large. On the contrary, the pressure difference reducing mechanism can be made further useful by making the parts compact and reducing the number of the parts.

SUMMARY OF THE INVENTION

Problem to be Solved by the Invention

The present invention is made by taking the above points into consideration, and an object of the present invention is to provide an accumulator which can reduce a pressure difference generated by a difference of coefficient of thermal expansion in the case that the liquid and the charged gas confined in the liquid chamber thermally expands at the zero-down time, can accordingly inhibit the plastic deformation from being generated in the bellows, and is structured such that parts are compact and the number of the parts is small.

Means for Solving the Problem

In order to achieve the object mentioned above, according to a first aspect of the present invention, there is provided an accumulator comprising:

an accumulator housing which has a port hole connected to a pressure piping of a device;

a bellows and a bellows cap which is arranged in an inner portion of the housing so as to partition an internal space of the housing into a gas chamber to which a high-pressure gas is charged and a liquid chamber which is communicated with the port hole; and a seal member which is retained to the port hole side of the bellows cap via a seal holder, wherein the seal member moves together with the bellows cap at a steady activating time, the seal member comes into contact with a seal portion which is provided in an inner portion of the housing so as to occlude the liquid chamber in the case that an operation of the device stops and the pressure within the pressure piping is lowered, the seal member moves in a direction that the bellows cap moves away from the seal portion while being in contact with the seal portion in the case that the liquid confined in the liquid chamber thermally expands in a state in which the liquid chamber is occluded, the seal member is obtained by attaching a flexible portion constructed by a rubber-like elastic body to an outer peripheral surface of a rigid plate, and the flexible portion allows relative movement of the bellows cap by shear deformation on the basis of engagement with the seal holder.

Further, an accumulator according to a second aspect of the present invention is the accumulator described in the first aspect mentioned above, wherein the rigid plate is set so that an outer diameter is smaller than an inner diameter of a flange portion provided in the seal holder, and the flexible portion is set so that an outer diameter is larger than the inner diameter of the flange portion.

Further, an accumulator according to a third aspect of the present invention is the accumulator described in the first aspect or the second aspect mentioned above, wherein a circumferentially continuous or discontinuous outer peripheral projection is provided in one surface in a thickness direction of the flexible portion, the outer peripheral projection coming into contact with the flange portion provided in the seal holder.

Further, an accumulator according to a fourth aspect of the present invention is the accumulator described in the first, second or third aspect mentioned above, wherein a groove portion is provided in both surfaces or one surface in a thickness direction of the flexible portion, the groove portion thinning the flexible portion at a part in a diametrical direction.

Further, an accumulator according to a fifth aspect of the present invention is the accumulator described in the first, second, third or fourth aspect mentioned above, wherein a seal projection is provided in one surface in a thickness direction of the rigid plate, the seal projection being constructed by a rubber-like elastic body coming into contact with the seal portion, and the seal projection is formed integrally with the flexible portion.

In the accumulator according to the present invention having the structure mentioned above, the seal member is obtained by attaching the flexible portion constructed by the rubber-like elastic body to the outer peripheral surface of the rigid plate, and the flexible portion allows the relative movement of the bellows cap by the shear deformation on the basis of the engagement with the seal holder. Therefore, the seal holder and the bellows cap relatively move in relation to the seal member by the shear deformation of the seal member. As a result, it is not necessary to set the allowance dimension for the relative movement in the seal holder as is different from the prior art shown in FIG. 13 mentioned above, and it is not necessary to embed the spring member in the seal holder. Accordingly, it is possible to downsize the parts by shortening the length of the seal holder in relation to the prior art shown in FIG. 13 mentioned above, and it is possible to reduce the parts number by omitting the spring member.

Further, the accumulator according to the present invention having the structure mentioned above is connected to the pressure piping of the device, and is activated as follows.

Steady Activating Time

Since the seal member is away from the seal portion by moving together with the bellows cap in a state in which the seal member is retained by the seal holder at the steady activating time of the accumulator, the port hole is communicated with the liquid chamber. Therefore, since the liquid having a pressure at any given time is introduced to the liquid chamber from the port hole at pleasure, the bellows cap moves at pleasure together with the seal member in such a manner that the liquid pressure and the charged gas pressure are balanced with each other.

Zero-Down Time

In the case that the operation of the device stops and the pressure within the pressure piping is lowered, the liquid within the liquid chamber is discharged little by little from the port hole, and the bellows cap is accordingly moved on the basis of the charged gas pressure in such a direction that the bellows cap comes close to the seal portion. As a result, the seal member comes into contact with the seal portion so as to form the so-called zero-down state. Therefore, since the liquid chamber is occluded and the partial liquid is confined in the liquid chamber, any further pressure reduction is not generated in the liquid chamber. Therefore, there is achieved a state in which the liquid pressure and the charged gas pressure are balanced in the inner and outer sides of the bellows.

Thermal Expanding Time in Zero-Down State

In the case that the liquid and the charged gas confined in the liquid chamber are thermally expanded due to the rise of the atmosphere temperature in the zero-down state, that is, the state in which the seal member comes into contact with the seal portion and the liquid chamber is occluded, the pressure difference is generated since the rising degree of the pressure is greater in the liquid than in the gas. However, in the accumulator, the bellows cap moves toward a direction that the bellows cap moves away from the seal portion on the basis of the pressure difference. Accordingly, since the state in which the liquid pressure and the charged gas pressure are balanced is maintained, the pressure difference is not generated in the inner and outer sides of the bellows. As a result, it is possible to inhibit the plastic deformation from being generated in the bellows. At this time, since the pressure receiving area of the seal member in the state in which the seal member is in contact with the seal portion is greater in the surface close to the bellows cap side than the surface close to the seal portion side, the seal member does not move while being in contact with the seal portion on the basis of the difference of the pressure receiving area in both the surfaces. Therefore, the port hole is kept closed. Further, since the seal member is structured such that the flexible portion constructed by the rubber-like elastic body is attached to the outer peripheral surface of the rigid plate as mentioned above, the flexible portion shear deforms on the basis of the engagement with the seal holder so as to allow the relative movement of the bellows cap. In other words, the seal holder and the bellows cap move toward the direction that the seal holder and the bellows cap move away from the seal portion while shear deforming the flexible portion.

The seal member is preferably structured such that the outer diameter of the rigid plate is set to be smaller than the inner diameter of the flange portion provided in the seal holder, and the outer diameter of the flexible portion is set to be larger than the inner diameter of the flange portion. According to this structure, the flexible portion is easily shear deformed on the basis of the engagement with the seal holder.

Further, in order to easily shear deform the flexible portion, it is preferable that the circumferentially continuous or discontinuous outer peripheral projection is provided in one surface in the thickness direction of the flexible portion, the outer peripheral projection coming into contact with the flange portion provided in the seal holder, or the groove portion is provided in both the surfaces or one surface in the thickness direction of the flexible portion, the groove portion partly thinning the flexible portion in the diametrical direction. According to these structures, it is possible to increase an amount of shear deformation of the flexible portion, and t is possible to increase the amount of relative movement between the seal member, and the seal holder and the bellows cap.

Further, the seal member may be structured such that the seal projection constructed by the rubber-like elastic body coming into contact with the seal portion is provided in one surface in the thickness direction of the rigid plate. According to this structure, it is possible to sufficiently secure a sealing performance in relation to the liquid, even in the case that the seal portion is constructed by a metal surface such as an end surface portion of a stay or an end surface portion of an oil port. Further, in this case, an elastic body forming frequency can be reduced at the parts manufacturing time by integrally forming the seal projection and the flexible portion.

Effect of the Invention

As described above, according to the present invention, the seal member is obtained by attaching the flexible portion constructed by the rubber-like elastic body to the outer peripheral surface of the rigid plate, and the flexible portion allows the relative movement of the bellows cap by the shear deformation on the basis of the engagement with the seal holder. Therefore, it is not necessary to set the allowance dimension for relatively moving the seal member in the seal holder, and it is not necessary to embed the spring member in the seal holder. Accordingly, it is possible to downsize the parts by shortening the length of the seal holder, and it is possible to reduce the parts number by omitting the spring member. Further, according to the present invention, since the seal member does not move while keeping the contact with the seal portion and only the bellows cap moves, it is additionally possible to reduce the pressure difference which is generated in the case that the liquid and the charged gas confined in the liquid chamber thermally expand at the zero-down time. Therefore, according to an initial object of the present invention, it is possible to inhibit the plastic deformation from being generated in the bellows when the liquid and the charged gas confined in the liquid chamber thermally expand at the zero-down time, and it is further possible to provide the accumulator structured such that the parts are downsized and the parts number is reduced.

Further, the flexible portion tends to shear deform in the case that the flexible portion engages with the seal holder, by setting the outer diameter of the flexible portion larger than the inner diameter of the flange portion as well as setting the outer diameter of the rigid plate smaller than the inner diameter of the flange portion provided in the seal holder, and it is possible to increase the amount of the relative movement between the seal member, and the seal holder and the bellow cap by the provision of the outer peripheral projection or the groove in the flexible portion. As a result, even in the case that the pressure difference generated in the case that the liquid and the charged gas confined in the liquid chamber thermally expand is great at the zero-down time, it is possible to quickly reduce the pressure difference.

Further, it is possible to sufficiently secure the sealing performance by the provision of the seal projection in the rigid plate even in the case that the seal portion is constructed by the metal surface such as the end surface portion of the stay or the end surface portion of the oil port, and it is possible to facilitate the manufacturing process of the parts by integrally forming the seal projection and the flexible portion.

DETAILED DESCRIPTION OF PREFERRED EMBODIMENTS

The following embodiments are included in the present invention.

(1) A seal member is provided in a bellows cap side for sealing the liquid (the backup fluid (BF)) which is confined in the liquid chamber, at the zero-down time.

(2) A gasket seal having a rubber portion (an elastic body portion) in an outer peripheral portion of a metal plate is used as the seal member.

(3) The gasket seal is provided between the bellows cap and the seal holder, and the rubber portion in the outer peripheral portion of the seal is deformed by the seal holder at the temperature rising time in the zero-down state. On the basis of the deformation, the seal holder and the bellows cap bonded by the seal holder displace in a direction of contracting the bellows, and enlarge a volumetric capacity of the BF.

(4) A seal projection may be provided in one surface of the metal plate.

(5) A rubber (an elastic body) projection or/and a groove portion may be provided in the rubber portion in the outer peripheral portion of the seal.

EMBODIMENTS

Next, a description will be given of embodiments according to the present invention with reference to the accompanying drawings.

First Embodiment

FIGS. 1 to 5 show an accumulator 1 according to a first embodiment of the present invention. The accumulator 1 according to the embodiment is a metal bellows type accumulator which employs a metal bellows as a bellows 9, and is structured as follows.

Figure 1:
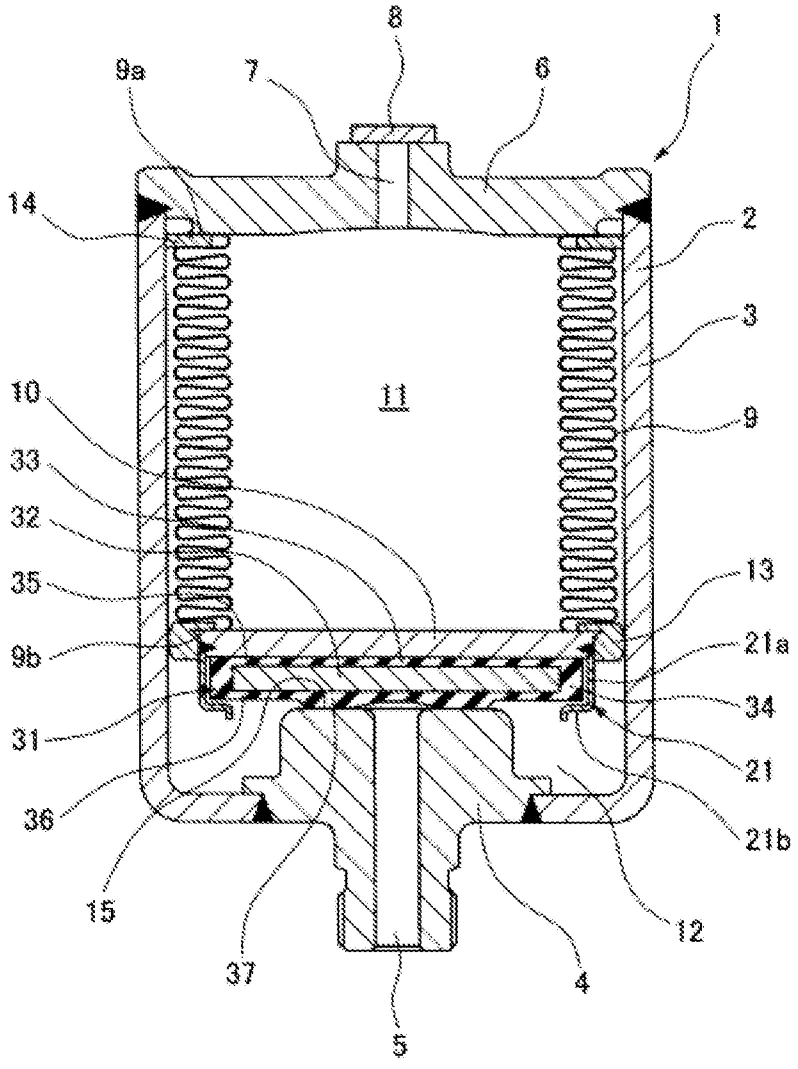
FIG. 1 is a cross sectional view of an accumulator according to a first embodiment of the present invention.

More specifically, as shown in FIG. 1, an accumulator housing 2 is provided so as to have a port hole 5 which is connected to a pressure piping of a device (not shown), a bellows 9 and a bellows cap 10 are arranged in an inner portion of the housing 2, and an internal space of the housing 2 is partitioned into a gas chamber 11 in which a high-pressure gas (for example, a nitrogen gas) is charged, and a liquid chamber 12 which is communicated with the port hole 5. The housing 2 is drawn as a housing constructed by a combination of a shell 3 which is formed into a closed-end cylindrical shape, an oil port 4 which is fixed (welded) to the center of a bottom portion of the shell 3 and is provided with the port hole 5 mentioned above, and a gas end cover 6 which is fixed (welded) to an upper end opening portion of the shell 3, however, a parts allocation structure of the housing 2 is not particularly limited. For example, the shell 3 and the oil port 4 may be integrated, and the shell 3 and the gas end cover 6 may be integrated. In any event, a gas inlet port 7 for injecting the gas to the gas chamber 11 is provided in the gas end cover 6 or a corresponding part, and the gas inlet port 7 is closed by a gas plug 8 after injecting the gas.

The bellows 9 is structured such that a fixed end 9*a* thereof is fixed (welded) to an inner surface of the gas end cover 6 which is an inner surface in an opposite port side of the housing 2, and a discoid bellows cap 10 is fixed (welded) to a floating end 9*b* thereof. As a result, the accumulator 1 is constructed as an internal gas type accumulator in which the gas chamber 11 is set in an inner peripheral side of the bellows 9 and the liquid chamber 12 is arranged in an outer peripheral side of the bellows 9. A vibration damping ring 13 is attached to an outer peripheral portion of the bellows cap 10 so as to prevent the bellows 9 and the bellows cap 10 from coming into contact with the inner surface of the housing 2, however, the vibration damping ring 13 does not achieve a sealing function. Reference numeral 14 denotes a protection ring.

A seal holder 21 is fixed to a surface close to the port side in the bellows cap 10, and a discoid seal member 31 is retained by the seal holder 21.

The seal holder 21 is obtained by integrally forming an annular flange portion 21*b* in an end portion close to the port side of a tubular portion 21*a* toward an inner side in a diametrical direction, and is fixed (by welding or fitting) to the bellows cap 10 by an end portion opposite to the port side of the tubular portion 21*a*.

Figure 2:
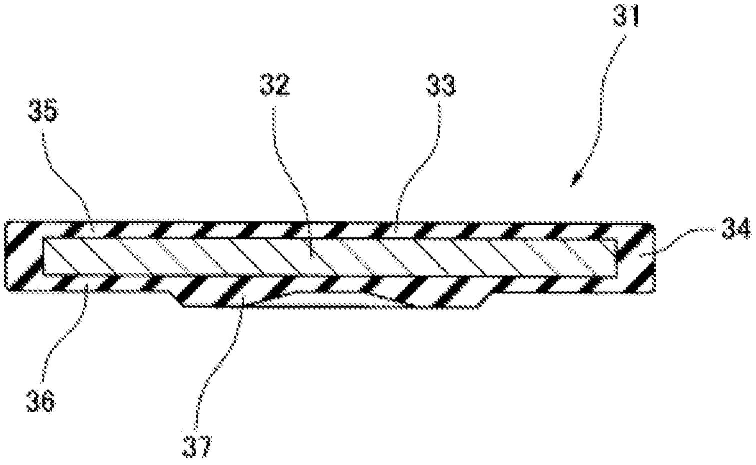
FIG. 2 is an enlarged cross sectional view of a seal member which is provided in the accumulator.

The seal member 31 is obtained by attaching (vulcanization bonding) a rubber-like elastic body 33 to a surface of a discoid rigid plate 32 which is made of a metal or a hard resin, as shown by a single part drawing in FIG. 2, an annular flexible portion 34, an opposite port side coating portion 35 and a port side coating portion 36 are integrally formed by the rubber-like elastic body 33, the annular flexible portion 34 being attached to an outer peripheral surface of the rigid plate 32, the opposite port side coating portion 35 being attached to an end surface opposite to the port in the rigid plate 32 and being formed into a thin film, and the port side coating portion 36 being attached to an end surface close to the port side in the rigid plate 32 and being formed into a thin film in the same manner, and an annular seal projection 37 is integrally formed so as to be positioned in the end surface close to the port side in the rigid plate 32. The seal projection 37 comes into contact with an inside end surface of the oil port 4 serving as the seal portion 15 of the accumulator 1 so as to be close to and away from the inside end surface. The rigid plate 32 is coated its whole surface by the rubber-like elastic body 33.

In the seal holder 21 and the seal member 31, each of dimensional data is set as follows.

More specifically, first of all, in the dimensions in the diametrical direction, an outer diameter of the rigid plate 32 is set to be smaller than an inner diameter of the seal holder 21, that is, an inner diameter of the flange portion 21*b*. On the contrary, an outer diameter of the flexible portion 34, that is, an outer diameter of the seal member 31 is set to be equal or approximately equal to an inner diameter of the tubular portion 21*a* in the seal holder and be somewhat smaller than the inner diameter, and is also set to be larger than the inner diameter of the seal holder 21, that is, the inner diameter of the flange portion 21*b*.

Further, in the dimensions in a thickness direction, a thickness of the flexible portion 34 is set to be equal or approximately equal to sum of a thickness of the rigid plate 32, a thickness of the opposite port side coating portion 35 and a thickness of the port side coating portion 36. Further, each of the sum of the thickness of the rigid plate 32, the thickness of the opposite port side coating portion 35 and the thickness of the port side coating portion 36 and the thickness of the flexible portion 34 is set to be equal to or approximately equal to a distance between the flange portion 21*b* and the bellows cap 10, however, since it is necessary to make the pressure of the liquid confined in the liquid chamber 12 at the zero-down time act on each of the port side end surface of the bellows cap 10 and the opposite port side end surface of the seal member 31, these thicknesses are preferably set to be somewhat smaller than the distance between the flange portion 21*b* and the bellows cap 10 for forming a small gap c1 (FIG. 3) between the bellows cap 10 and the seal member 31.

Further, in conjunction with this, a communication path communicating the liquid chamber 12 and the gap c1 is provided for intruding the pressure of the liquid confined in the liquid chamber 12 at the zero-down time to the gap c1 between the bellows cap 10 and the seal member 31. The communication path may be constructed by the gap between the flexible portion 34 and the seal holder 21 (a communication path running into the gap c1 between the bellows cap 10 and the seal member 31 from the liquid chamber 12 via the gap between the flexible portion 34 and the flange portion 21*b* and the gap between the flexible portion 34 and the tubular portion 21*a*), however, the communication path is insufficient, the communication path may be formed by a notch which is provided partly on a circumference of the seal holder 21, a notch which is provided partly on a circumference of the flexible portion 34 or a through hole which is provided so as to pass through the seal member 31 in a thickness direction, each of which is not illustrated.

The seal holder 21 retains only the seal member 31, and the seal holder 21 does not retain any kind of spring member (including a spring constructed by a rubber-like elastic body in addition to a spring made of a metal).

Next, a description will be given of an activation of the accumulator 1 having the structure mentioned above.

Steady Activating Time

Figure 3:
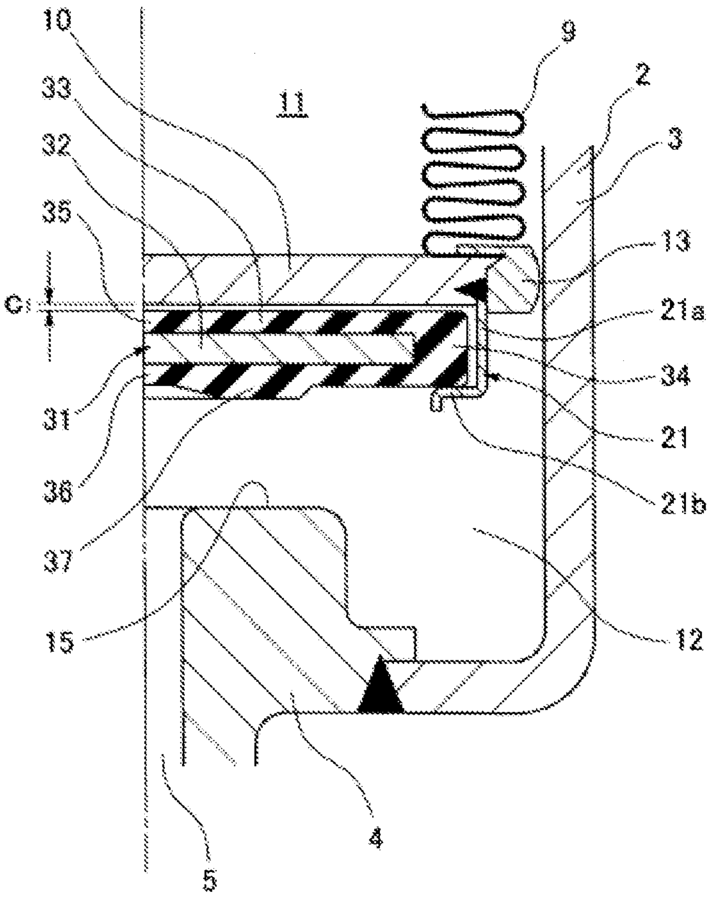
FIG. 3 is an enlarged cross sectional view of a substantial part and shows a state of the accumulator at the steady activating time.

FIG. 3 shows a state of the accumulator 1 at the steady activating time. The port hole 5 is connected to a pressure piping of a device (not shown). At this steady activating time, the seal member 31 is away from the seal portion 15 by moving together with the bellows cap 10 in a state in which the seal member 31 is retained by the seal holder 21. Accordingly, the port hole 5 is communicated with the liquid chamber 12. Therefore, since the liquid having a pressure at any given time is introduced to the liquid chamber 12 from the port hole 5 at pleasure, the bellows cap 10 moves at pleasure together with the seal member 31 in such a manner that the liquid pressure and the charged gas pressure are balanced with each other.

Zero-Down Time

Figure 4:
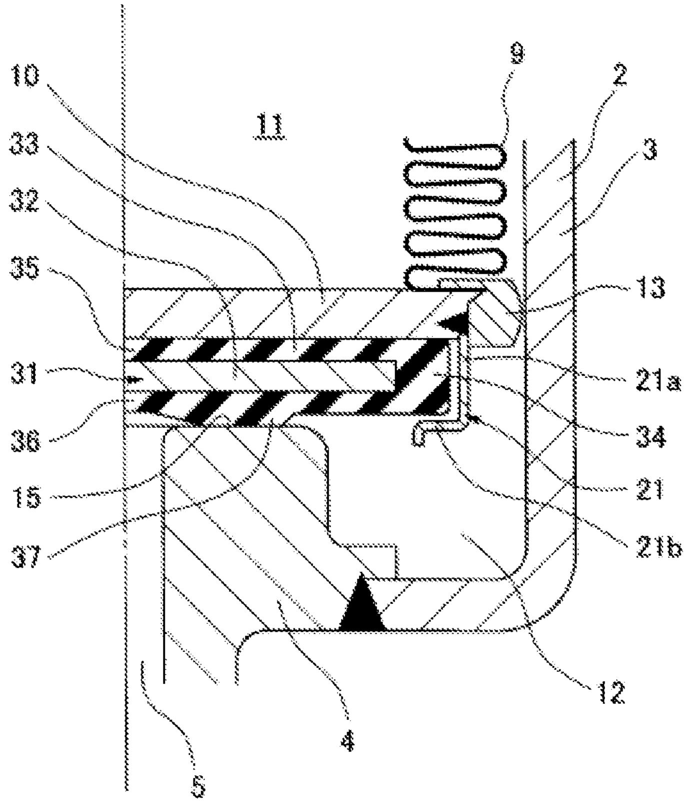
FIG. 4 is an enlarged cross sectional view of a substantial part and shows a state of the accumulator at the zero-down time.

In the case that the operation of the device stops and the pressure within the pressure piping is lowered from the state in FIG. 3, the liquid within the liquid chamber 12 is discharged little by little from the port hole 5, and the bellows cap 10 is accordingly moved on the basis of the charged gas pressure in such a direction that the bellows cap 10 comes close to the seal portion 15, as shown in FIG. 4. As a result, the seal member 31 comes into contact with the seal portion 15 by the seal projection 37 so as to form the so-called zero-down state. Therefore, since the liquid chamber 12 is occluded and the partial liquid is confined in the liquid chamber 12, any further pressure reduction is not generated in the liquid chamber 12. Therefore, there is achieved a state in which the liquid pressure and the charged gas pressure are balanced in the inner and outer sides of the bellows 9. The liquid confined in the liquid chamber 12 may be called as a backup fluid (BF).

Thermal Expanding Time in Zero-Down State

In the case that the liquid and the charged gas confined in the liquid chamber 12 are thermally expanded due to the rise of the atmosphere temperature in the zero-down state in FIG. 4, that is, the state in which the seal member 31 comes into contact with the seal portion 15 and the liquid chamber 12 is occluded, the pressure difference is generated since the rising degree of the pressure is greater in the liquid than in the gas. However, in the accumulator 1, the bellows cap 10 moves toward a direction that the bellows cap 10 moves away from the seal portion 15 on the basis of the pressure difference while shear deforming the flexible portion 34. Accordingly, since the state in which the liquid pressure and the charged gas pressure are balanced is maintained, the pressure difference is not generated in the inner and outer sides of the bellows 9. As a result, it is possible to inhibit the plastic deformation from being generated in the bellows 9. At this time, since the pressure receiving area of the seal member 31 in the state in which the seal member 31 is in contact with the seal portion 15 is greater in the surface close to the bellows cap 10 side than the surface close to the seal portion 15 side (this is because the portion closer to the inner peripheral side than the seal projection 37 does not act as the pressure receiving surface on the surface close to the seal portion 15 side), the seal member 31 does not move while being in contact with the seal portion 15 on the basis of the difference of the pressure receiving area in both the surfaces. Therefore, the port hole 5 is kept closed, and the gap between the bellows cap 10 and the seal member 31 is enlarged its magnitude (c1<c2).

Zero-Down Dissolving Time

Figure 5:
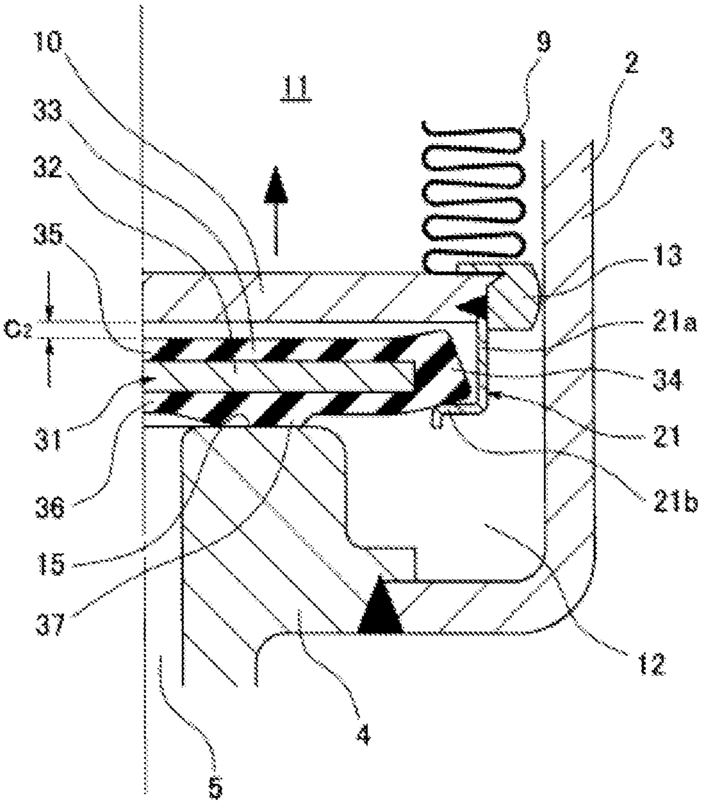
FIG. 5 is an enlarged cross sectional view of a substantial part and shows a state of the accumulator at the thermal expanding time in a zero-down state.

In the case that the operation of the device is restarted and the pressure within the pressure piping rises from the state in FIG. 4 or FIG. 5, the pressure acts on the seal member 31 from the port hole 5 so as to move the seal member 31 away from the seal portion 15. Therefore, the port hole 5 is opened, the liquid is introduced to the liquid chamber 12, and the state returns to the state at the steady activating time in FIG. 3.

According to the accumulator 1 having the structure mentioned above, since the seal member 31 is obtained by attaching the flexible portion 34 constructed by the rubber-like elastic body to the outer peripheral surface of the rigid plate 32, and the flexible portion 34 allows the relative movement of the bellows cap 10 by shear deforming on the basis of the engagement with the seal holder 21, it is not necessary to set the allowance dimension for relatively moving the seal member 31 in the seal holder 21, and it is not necessary embed the spring member 41. Therefore, since the length of the seal holder 21 can be reduced in comparison with the prior art in FIG. 13, it is possible to downsize the parts. Further, since the spring member 41 can be omitted, it is possible to reduce the parts number.

Further, according to the accumulator 1 having the structure mentioned above, since the seal member 31 does not move while being in contact with the seal portion 15, but only the bellows cap 10 moves, it is possible to reduce the pressure difference generated when the liquid and the charged gas confined in the liquid chamber 12 at the zero-down time thermally expand.

Therefore, according to the above, it is possible to inhibit the plastic deformation from being generated in the bellows as originally intended when the liquid and the charged gas confined in the liquid chamber 12 at the zero-down time thermally expand. Further, it is possible to provide the accumulator structured such that the parts are downsized and the parts number is reduced. Further, since the seal projection 37 is attached to the rigid plate 32, it is possible to sufficiently secure the sealing performance even in the case that the seal portion 15 is constructed by the metal surface such as the end surface portion of the stay or the end surface portion of the oil port 4. Further, since the seal projection 37 and the flexible portion 34 are integrally formed, it is possible to facilitate the manufacturing process of the parts.

In the accumulator 1 according to the first embodiment mentioned above, there can be thought that the structures are added and changed as follows.

(1) Second Embodiment

Figure 6:
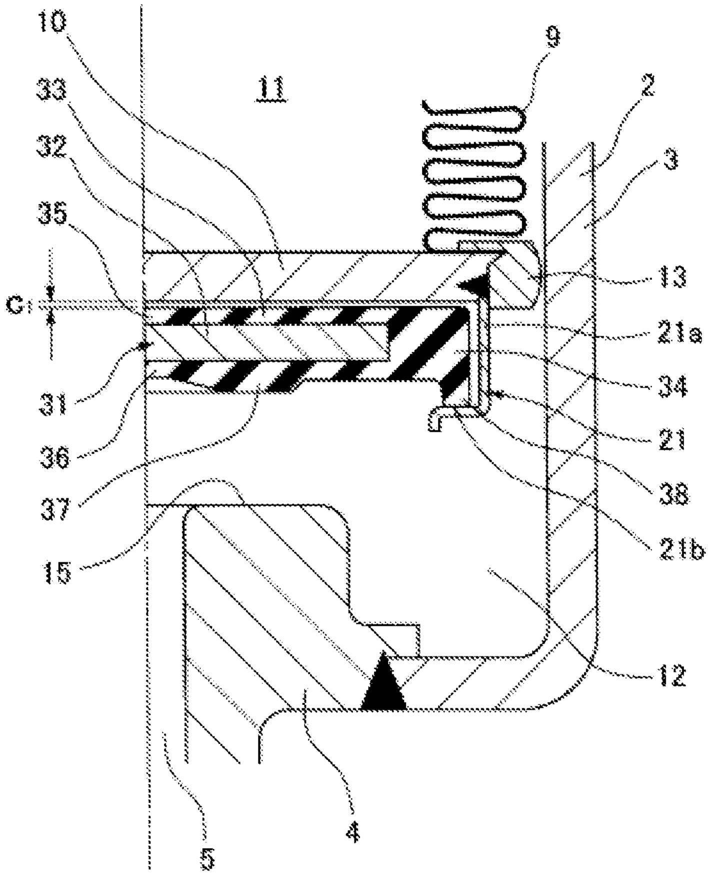
FIG. 6 is a cross sectional view of a substantial part and shows a state of an accumulator according to a second embodiment of the present invention at the steady activating time.
Figure 7:
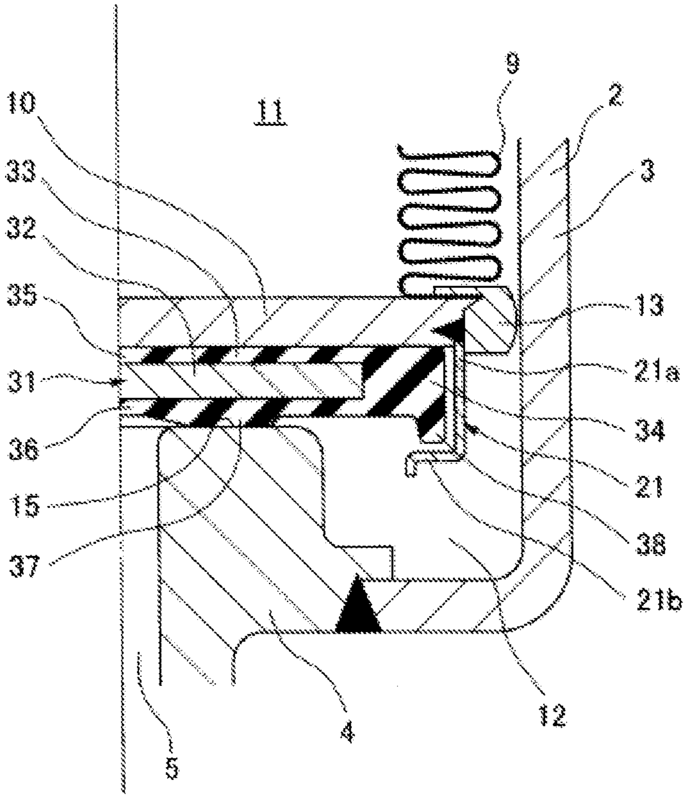
FIG. 7 is a cross sectional view of a substantial part and shows a state of the accumulator at the zero-down time.
Figure 8:
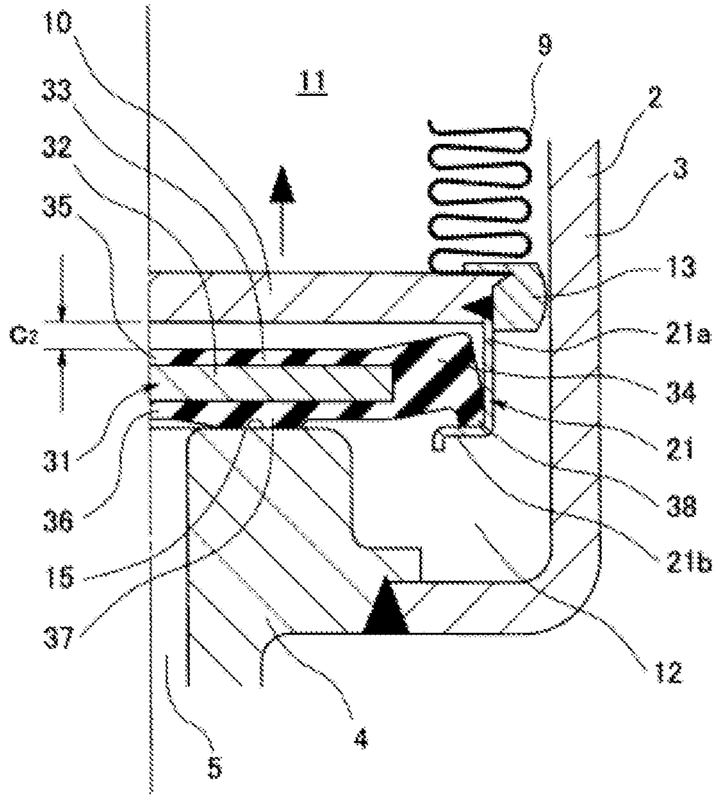
FIG. 8 is a cross sectional view of a substantial part and shows a state of the accumulator at the thermal expanding time in a zero-down state.

As a second embodiment, an outer peripheral projection 38 is integrally formed in the port side end surface of the flexible portion 34 in the seal member 31, the outer peripheral projection 38 coming into contact with and engaging with the inside end surface of the flange portion 21*b* of the seal holder 21, as shown in FIGS. 6 to 8. According to the structure, it is possible to increase a deforming amount of the shear deformation of the flexible portion 34, and it is possible to increase the amount of the relative movement between the seal member 31 and the seal holder 21, further between the seal member 31 and the bellows cap 10. The outer peripheral projection 38 is provided in an outermost peripheral portion of the port side end surface of the flexible portion 34. The outer peripheral projection 38 is provided circumferentially continuous (annular), however, may be provided circumferentially discontinuous.

(2) Third Embodiment

Figure 9:
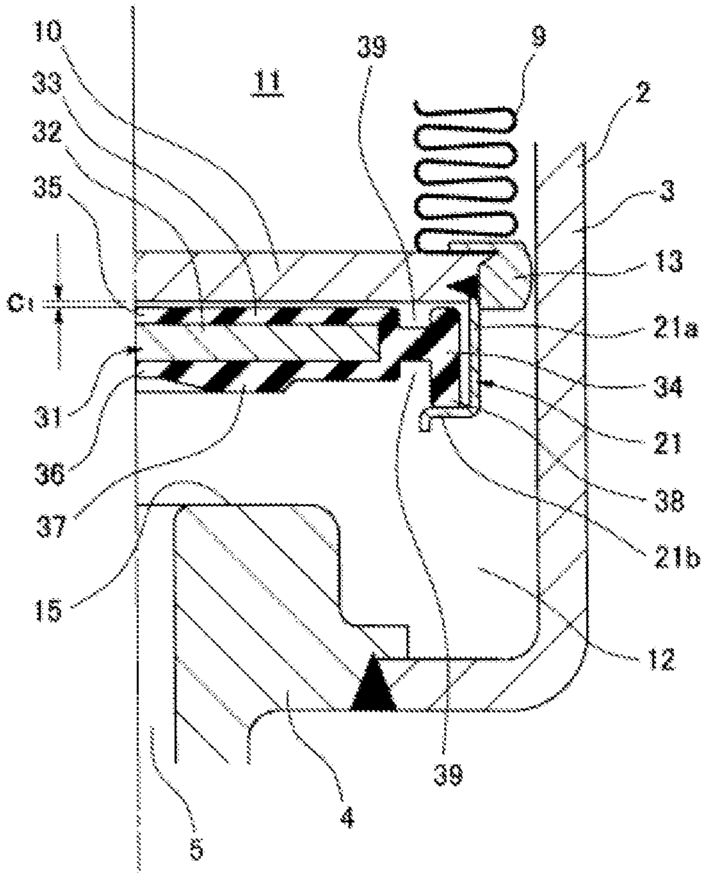
FIG. 9 is a cross sectional view of a substantial part and shows a state of an accumulator according to a third embodiment of the present invention at the steady activating time.
Figure 10:
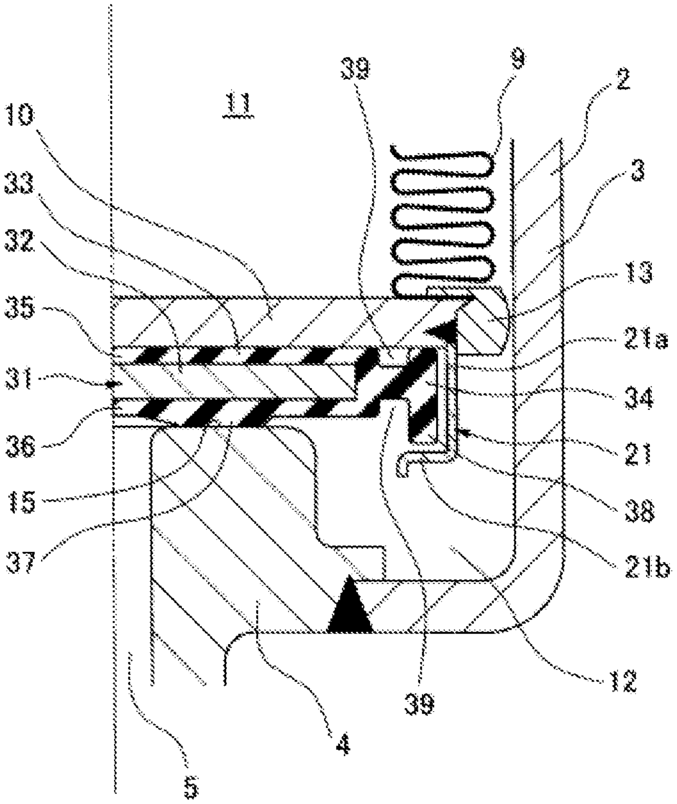
FIG. 10 is a cross sectional view of a substantial part and shows a state of the accumulator at the zero-down time.
Figure 11:
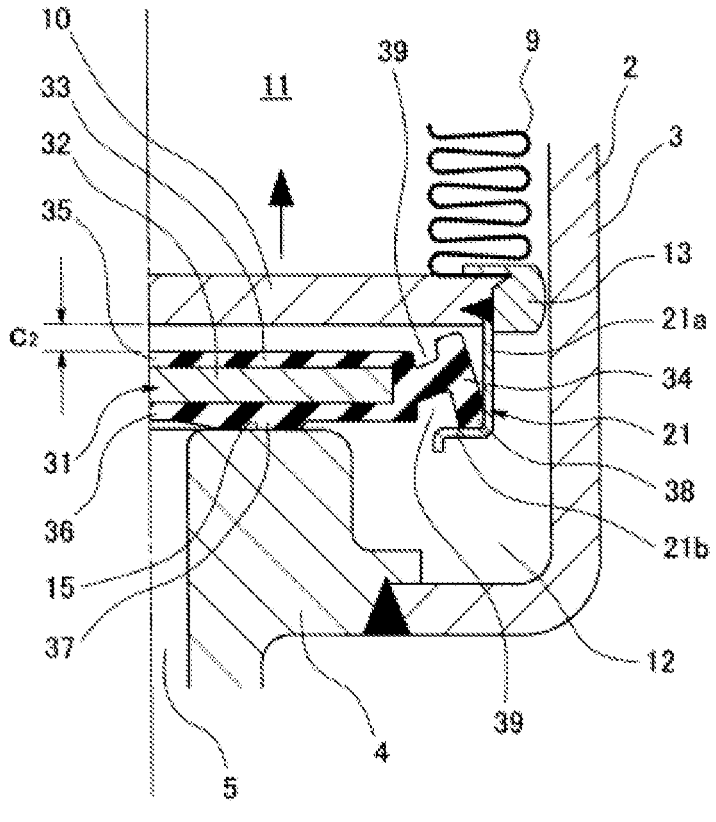
FIG. 11 is a cross sectional view of a substantial part and shows a state of the accumulator at the thermal expanding time in a zero-down state.
Figure 12:
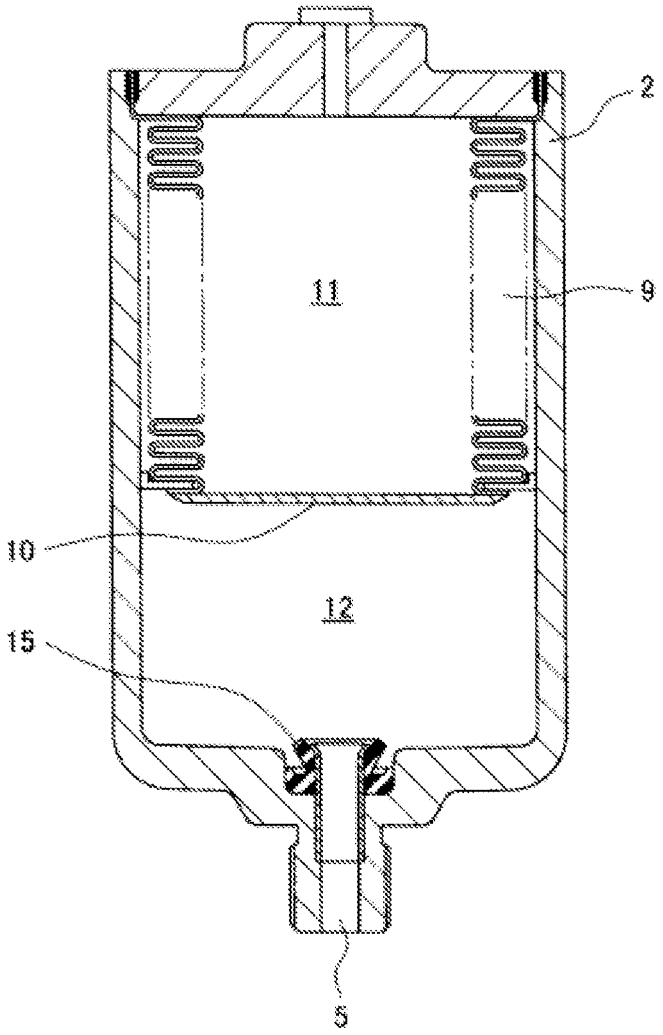
FIG. 12 is a cross sectional view of an accumulator according to a prior art.

As a third embodiment, a groove portion 39 is provided in each of the port side end surface and the opposite port side end surface of the flexible portion 34 in the seal member 31, the groove portion 39 being obtained by thinning the thickness of the flexible portion 34 partially in the diametrical direction, as shown in FIGS. 9 to 11. According to the structure, in the same manner as the second embodiment mentioned above, it is possible to increase the deforming amount of the shear deformation of the flexible portion 34, and it is possible to increase the amount of the relative movement between the seal member 31 and the seal holder 21, further between the seal member 31 and the bellows cap 10. Since the outer peripheral projection 38 according to the second embodiment is provided in the port side end surface of the flexible portion 34 in the drawing, the groove portion 39 is provided in an inner peripheral side of the outer peripheral projection 38 in the port side end surface. The groove portion 39 is provided circumferentially continuous (annular), however, may be provided circumferentially discontinuous. The groove portion 39 may be provided only in any one of the port side end surface and the opposite port side end surface of the flexible portion 34.

(3)

Figure 13:
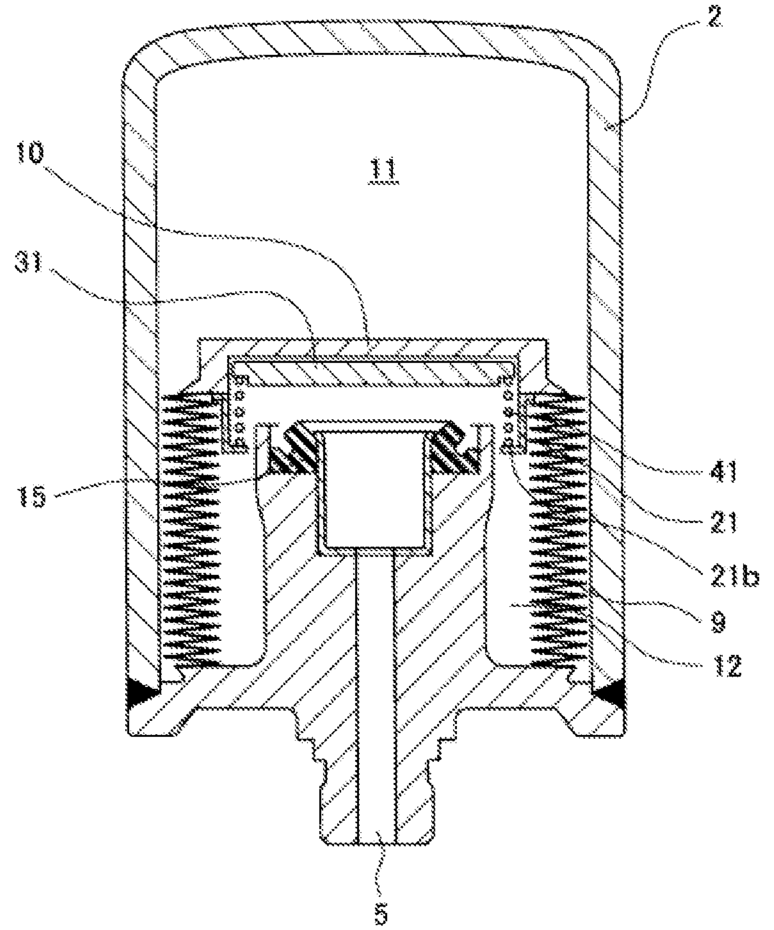
FIG. 13 is a cross sectional view of a substantial part and shows a state of an accumulator according to the other prior art at the steady activating time.
Figure 14:
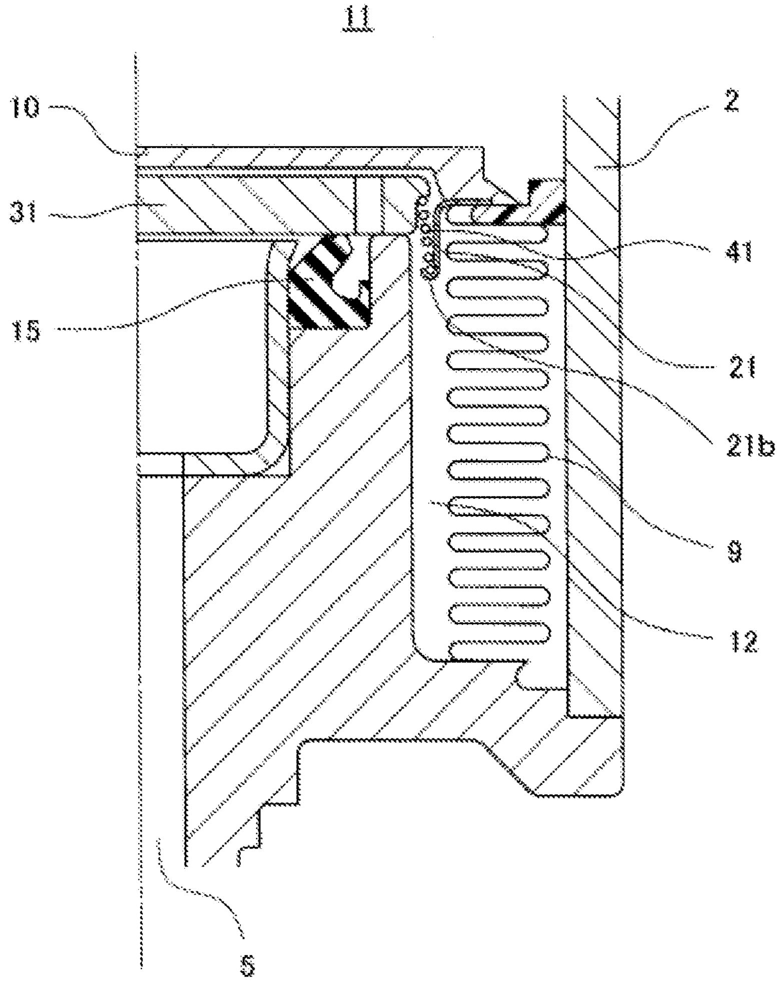
FIG. 14 is a cross sectional view of a substantial part and shows a state of the accumulator at the zero-down time.
Figure 15:
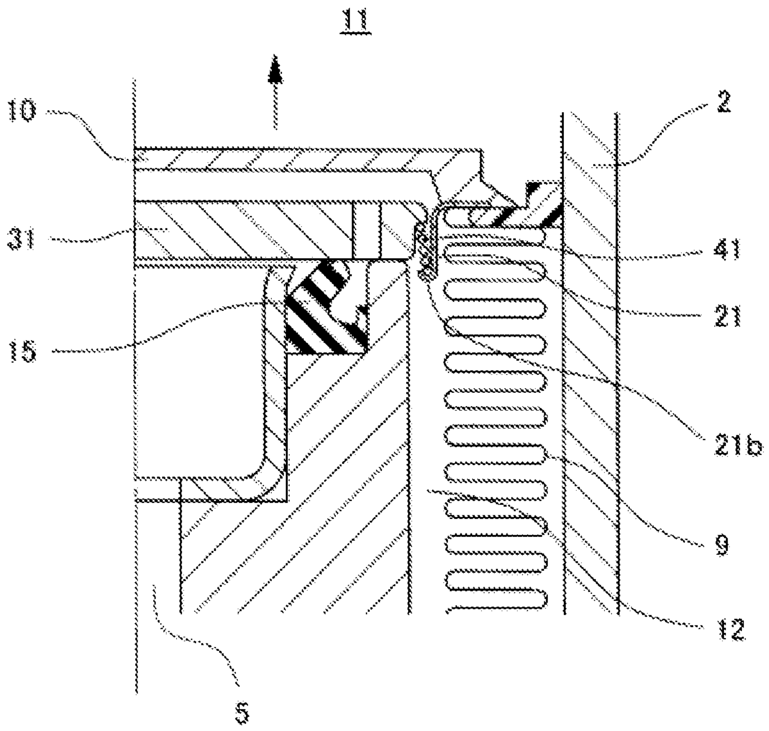
FIG. 15 is a cross sectional view of a substantial part and shows a state of the accumulator at the thermal expanding time in a zero-down state.

In the first embodiment, the accumulator 1 is constructed by the internal gas type accumulator in which the gas chamber 11 is set to the inner peripheral side of the bellows 9, and the liquid chamber 12 is arranged in the outer peripheral side of the bellows 9, however, the accumulator 1 may be constructed by an external gas type accumulator in which the gas chamber 11 is set to the outer peripheral side of the bellows 9 and the liquid chamber 12 is arranged in the inner peripheral side of the bellows 9 as shown in FIG. 13 mentioned above. In other words, the internal gas type accumulator and the external gas type accumulator are both included in the present invention.

(4)

In the first embodiment mentioned above, the seal portion 14 with which the seal member 31 comes into contact so as to be close to and away from is constructed by the inside end surface of the oil port 4, however, may be constructed by a lip seal which is formed by a rubber-like elastic body provided in a peripheral edge portion of an inside opening of the port hole as shown in FIG. 13 mentioned above. Further, in the external gas type accumulator, a stay member may be installed to an inner peripheral side of the bellows 9 in an inner side (close to the bellows cap side) of the oil port 4 for leveling up the height position of the seal portion 15, however, the seal portion 15 may be constructed by the end surface portion of the stay member in this case. Further, in the case that the seal portion 15 is constructed by the lip seal, the seal member 31 may be structured such that the rigid plate 32 comes into direct contact with the lip seal.

What is claimed is:

1. An accumulator comprising:

an accumulator housing which has a port hole connected to a pressure piping of a device;

a bellows and a bellows cap which is arranged in an inner portion of said housing so as to partition an internal space of said housing into a gas chamber to which a high-pressure gas is charged and a liquid chamber which is communicated with said port hole; and a seal member which is retained to the port hole side of said bellows cap via a seal holder, wherein said seal member includes a discoid rigid plate, a flexible portion constructed by an elastomeric material and attached to an outer peripheral surface of the rigid plate, and a seal projection positioned on an end surface of the rigid plate, the end surface being close to the port hole side of the rigid plate, wherein said seal member moves together with said bellows cap at a steady activating time, said seal projection comes into contact with a seal portion which is provided in an inner portion of said housing so as to occlude said liquid chamber to confine a partial liquid in the liquid chamber in the case that an operation of said device stops and the pressure within said pressure piping is lowered, and said seal projection moves in a direction that said bellows cap moves away from said seal portion while shear deforming the flexible portion of said seal member while being in contact with said seal portion in the case that the liquid confined in said liquid chamber thermally expands in a state in which said liquid chamber is occluded, and wherein said flexible portion is configured to allow relative movement of said bellows cap by shear deformation on the basis of engagement with said seal holder.

2. The accumulator according to claim 1, wherein said rigid plate is set so that an outer diameter is smaller than an inner diameter of a flange portion provided in said seal holder, and wherein said flexible portion is set so that an outer diameter is larger than the inner diameter of said flange portion.

3. The accumulator according to claim 1, wherein a circumferentially continuous or discontinuous outer peripheral projection is provided in one surface in a thickness direction of said flexible portion, the outer peripheral projection coming into contact with a flange portion provided in said seal holder.

4. The accumulator according to claim 1, wherein a groove portion is provided in both surfaces or one surface in a thickness direction of said flexible portion, the groove portion thinning said flexible portion at a part in a diametrical direction.

5. The accumulator according to claim 1, wherein a seal projection is provided in one surface in a thickness direction of said rigid plate, the seal projection being constructed by a rubber-like elastic body coming into contact with said seal portion, and said seal projection is formed integrally with said flexible portion.

6. The accumulator according to claim 2, wherein a circumferentially continuous or discontinuous outer peripheral projection is provided in one surface in a thickness direction of said flexible portion, the outer peripheral projection coming into contact with a flange portion provided in said seal holder.

7. The accumulator according to claim 2, wherein a groove portion is provided in both surfaces or one surface in a thickness direction of said flexible portion, the groove portion thinning said flexible portion at a part in a diametrical direction.

8. The accumulator according to claim 3, wherein a groove portion is provided in both surfaces or one surface in a thickness direction of said flexible portion, the groove portion thinning said flexible portion at a part in a diametrical direction.

9. The accumulator according to claim 6, wherein a groove portion is provided in both surfaces or one surface in a thickness direction of said flexible portion, the groove portion thinning said flexible portion at a part in a diametrical direction.

10. The accumulator according to claim 2, wherein a seal projection is provided in one surface in a thickness direction of said rigid plate, the seal projection being constructed by a rubber-like elastic body coming into contact with said seal portion, and said seal projection is formed integrally with said flexible portion.

11. The accumulator according to claim 3, wherein a seal projection is provided in one surface in a thickness direction of said rigid plate, the seal projection being constructed by a rubber-like elastic body coming into contact with said seal portion, and said seal projection is formed integrally with said flexible portion.

12. The accumulator according to claim 4, wherein a seal projection is provided in one surface in a thickness direction of said rigid plate, the seal projection being constructed by a rubber-like elastic body coming into contact with said seal portion, and said seal projection is formed integrally with said flexible portion.

13. The accumulator according to claim 6, wherein a seal projection is provided in one surface in a thickness direction of said rigid plate, the seal projection being constructed by a rubber-like elastic body coming into contact with said seal portion, and said seal projection is formed integrally with said flexible portion.

14. The accumulator according to claim 7, wherein a seal projection is provided in one surface in a thickness direction of said rigid plate, the seal projection being constructed by a rubber-like elastic body coming into contact with said seal portion, and said seal projection is formed integrally with said flexible portion.

15. The accumulator according to claim 8, wherein a seal projection is provided in one surface in a thickness direction of said rigid plate, the seal projection being constructed by a rubber-like elastic body coming into contact with said seal portion, and said seal projection is formed integrally with said flexible portion.

16. The accumulator according to claim 9, wherein a seal projection is provided in one surface in a thickness direction of said rigid plate, the seal projection being constructed by a rubber-like elastic body coming into contact with said seal portion, and said seal projection is formed integrally with said flexible portion.

* * * * *